US012606471B2

(12) United States Patent
Miller et al.

(10) Patent No.: US 12,606,471 B2
(45) Date of Patent: Apr. 21, 2026

(54) APPARATUS AND METHOD FOR OXIDATIVE TREATMENT OF ORGANIC CONTAMINANTS IN WASTE WATER

(71) Applicant: Eau Midstream Inc., Phoenix, AZ (US)

(72) Inventors: Francis C. Miller, Pace, FL (US); Steve Addleman, Somerset, PA (US)

(73) Assignee: Eau Midstream, Inc., Phoenix, AZ (US)

( * ) Notice: Subject to any disclaimer, the term of this patent is extended or adjusted under 35 U.S.C. 154(b) by 0 days.

(21) Appl. No.: 15/930,837

(22) Filed: May 13, 2020

(65) Prior Publication Data

US 2021/0024387 A1    Jan. 28, 2021

Related U.S. Application Data

(63) Continuation of application No. 15/023,014, filed as application No. PCT/US2014/056278 on Sep. 18, 2014, now abandoned.

(Continued)

(51) Int. Cl.
*C02F 1/78*          (2023.01)
*C02F 1/72*          (2023.01)
(Continued)

(52) U.S. Cl.
CPC ................ *C02F 1/78* (2013.01); *C02F 1/722* (2013.01); *C02F 2101/30* (2013.01);
(Continued)

(58) Field of Classification Search
CPC .... C02F 1/78; C02F 1/722; C02F 1/72; C02F 1/782; C02F 2209/005; C02F 2209/04;
(Continued)

(56) References Cited

U.S. PATENT DOCUMENTS 2,985,307 A    5/1961  Grasmere et al.
5,124,051 A *  6/1992  Bircher ..................... C02F 1/78
                                                     210/903

(Continued)

FOREIGN PATENT DOCUMENTS

CN        102030435 A      4/2011
WO    WO 2011/026197 A1    3/2011
WO    WO 2012/151233 A1    11/2012

OTHER PUBLICATIONS

Kerfoot Technolgies Inc. website at https://www.kerfoottech.com/environmental-technology-products-c-sparger.asp, titled, C-Sparger® "Genesis of Ozone Sparging," printed Sep. 19, 2022. EFS file name Sep. 23, 2022_15-930837_IDS_NPL_Cite1.

(Continued)

*Primary Examiner* — Akash K Varma
(74) *Attorney, Agent, or Firm* — Knobbe, Martens, Olson & Bear, LLP

(57)                ABSTRACT

A method of making an aqueous mixture of ozone and water comprising pumping a solution of ozonated water through a high cavitation rate homogenizing device, thereby causing formation of gas phase nanobubbles of ozone in the solution. The high cavitation rate homogenizing device may be a homogenizing mixer. The high cavitation rate homogenizing device may be comprised of rotors and stators moving in close proximity relative to each other and separated by the solution of ozonated water. The relative motion of the rotors and stators may cause up to 500 million cavitation events per second in the solution of ozonated water, thereby causing the formation of gas phase nanobubbles of ozone. A computer-implemented method of treating waste water from a source is also disclosed. The method may include making the aqueous mixture of ozone and water.

11 Claims, 4 Drawing Sheets

Related U.S. Application Data

(60) Provisional application No. 61/880,115, filed on Sep. 19, 2013.

(51) Int. Cl.
*C02F 101/30* (2006.01)
*C02F 103/10* (2006.01)

(52) U.S. Cl.
CPC .... *C02F 2103/10* (2013.01); *C02F 2209/005* (2013.01); *C02F 2209/04* (2013.01); *C02F 2209/06* (2013.01); *C02F 2209/20* (2013.01)

(58) Field of Classification Search
CPC .............. C02F 2209/06; C02F 2209/20; C02F 2103/10; C02F 2201/782; C02F 2305/08; C02F 2101/30
USPC .................................................. 210/739, 759
See application file for complete search history.

(56) References Cited

U.S. PATENT DOCUMENTS

| | | | |
|---|---|---|---|
| 5,512,178 A | 4/1996 | Dempo | |
| 5,635,071 A | 6/1997 | Al-Samadi | |
| 5,643,443 A | 7/1997 | Ishikura | |
| 5,855,775 A | 1/1999 | Kerfoot | |
| 6,338,789 B1 | 1/2002 | Hecking | |
| 7,344,647 B2 | 3/2008 | Stewart | |
| 7,931,816 B2 | 4/2011 | Conger et al. | |
| 7,967,988 B1 | 6/2011 | Miller | |
| 7,972,517 B1 | 7/2011 | Miller | |
| 8,956,529 B2 | 2/2015 | Byrne et al. | |
| 2001/0007314 A1 | 7/2001 | Sherman | |
| 2005/0258094 A1* | 11/2005 | Chiba | C02F 3/12 |
| | | | 210/627 |
| 2007/0034571 A1 | 2/2007 | Costa et al. | |
| 2007/0102359 A1 | 5/2007 | Lombardi et al. | |
| 2008/0061006 A1* | 3/2008 | Kerfoot | C02F 1/78 |
| | | | 210/760 |
| 2008/0237141 A1 | 10/2008 | Kerfoot | |
| 2009/0173692 A1 | 7/2009 | Laraway et al. | |
| 2010/0125044 A1 | 5/2010 | Keister | |
| 2010/0300966 A1 | 12/2010 | Kelsey et al. | |
| 2010/0314327 A1 | 12/2010 | Lean et al. | |
| 2011/0042320 A1 | 2/2011 | Allen | |
| 2011/0094965 A1 | 4/2011 | Al-Samadi | |
| 2011/0186525 A1 | 8/2011 | Dixit | |
| 2012/0145643 A1 | 6/2012 | Pandya | |
| 2012/0279925 A1 | 11/2012 | Miller et al. | |
| 2014/0042058 A1 | 2/2014 | Janssen et al. | |
| 2016/0068417 A1 | 3/2016 | Buschmann | |
| 2019/0248689 A1 | 8/2019 | Miller et al. | |
| 2023/0227734 A1 | 7/2023 | Miller et al. | |

OTHER PUBLICATIONS

U.S. Appl. No. 12/914,072, filed Oct. 28, 2010, Miller.

Cheremisinoff, "Chapter 3—Chemical Additives That Enhance Filtration", Handbook of Water and Wastewater Treatment Technologies, 39 pages, 2002.

Huchler, "Is Your Cold Lime Softener Effective", CEP, Dec. 2007, pp. 41-48.

Office Action in U.S. Appl. No. 14/765,027, filed May 16, 2018.

* cited by examiner

APPARATUS AND METHOD FOR OXIDATIVE TREATMENT OF ORGANIC CONTAMINANTS IN WASTE WATER

CROSS-REFERENCE TO RELATED PATENT APPLICATIONS

This application is a continuation of copending U.S. patent application Ser. No. 15/023,014, which is a national stage application under 35 U.S.C. 371(c) of PCT Application No. US2014/056278 filed Sep. 18, 2014, which claims the benefit of U.S. Provisional Application for patent No. 61/880,115, filed Sep. 19, 2013. The above benefit/priority claims are being made in an Application Data Sheet submitted herewith in accordance with 37 C.F.R. 1.76 (b)(5) and 37 C.F.R. 1.78. The disclosures of these United States patent applications are incorporated herein by reference.

TECHNICAL FIELD

Treatment of organic contaminants in waste water by oxidative decomposition.

BACKGROUND ART

Considerable advances in the treatment of waste waters with ozone gas have been developed over the past two decades. One significant issue with the implementation of this technology has been in the area of maintenance. When treating waste waters, the surfaces of the ozone gas diffusion equipment may become fouled with the contaminants and impact on system performance. In the municipal waste water industry this condition has limited the use of the technology in the area of sludge stabilization. In the agricultural industry this has limited the use of the technology in the area of raw dairy manure treatment. In the oil and gas field industry this condition has limited the use of ozone technology in the areas of drilling waste treatment and waste waters with entrained oily contaminants.

In many cases, the contaminants are not completely eliminated by the ozone, and processes referred to as advance oxidation technology are required to achieve the desired level of treatment. Advanced oxidation is a process in which additional quantities of free radicals, such as hydroxyl radicals or oxygen atom radicals are produced, which are constituents that perform significant oxidative chemical attack on the contaminants. This advanced oxidation may typically utilize hydrogen peroxide in conjunction with the ozone. Many of the treatment processes require extended contact periods with the ozone and/or the hydrogen peroxide in order to complete the treatment process. The extended contact periods necessary to achieve desired treatment levels as well as the concentration of the ozone and/or the hydrogen peroxide will often vary within a given process over various materials being treated. Means to accommodate these variable parameters are rare, and if present, often have limited flexibility.

What is needed is a means to utilize ozone in a manner which will mitigate the issues associated with the fouling of the gas diffusion equipment and/or accommodate extended reaction times for the process in a flexible manner.

SUMMARY

The Applicants have developed a process which is capable of addressing each of these needs separately or together. The Applicants have determined through experimentation with a commercial scale prototype apparatus and process that there are unique ozone and hydrogen peroxide concentration correlations for the treatment of various waste streams, which obviate the need for using gas bubbling equipment that is subject to fouling. The instant apparatus and process have been developed with control and automation capabilities which may be utilized to optimize the system performance according to such correlations.

Additionally, in accordance with the present disclosure, in the use of ozonation for oxidative decomposition of organic contaminants in waste water, the problem of fouling of gas diffusion or gas bubbling devices exposed to the waste water is solved by a method that includes injecting a stream of ozonated source water into a stream of the waste water, and then subjecting the combined streams to high cavitation homogenization and mixing. The method may include causing cavitation within the combined stream by the homogenization, thereby causing the formation of nanobubbles of ozone within the combined stream. The nanobubbles may be caused to dissolve into the liquid phase of the combined stream, wherein they subsequently oxidize organic contaminants that were present in the waste water stream. The method may include injecting hydrogen peroxide solution into the waste water stream, thereby enhancing the oxidation and decomposition of the organic contaminants into species such as carbon dioxide and water.

The method may include performing the oxidative decomposition in a first stage and a second stage. The first and second stages may each include injecting ozonated source water into the waste water; subjecting the combined ozonated source water and waste water streams to high cavitation mixing by a homogenizer or other suitable high cavitation rate device; and delivery of the homogenized stream to a retention tank. The homogenized stream may be caused to flow through the retention tank in substantially plug flow. In certain embodiments, hydrogen peroxide solution may be injected into the combined ozonated source water and waste water streams before or after homogenization.

Also according to the present disclosure, an apparatus is provided for causing oxidative decomposition of organic contaminants in waste water. The apparatus may include a first oxidative stage and a second oxidative stage, with both stages including a homogenizer and a retention tank as described above. In certain embodiments, the apparatus may be made portable to a site where the waste water is produced.

Also according to the present disclosure, a method of making an aqueous mixture of ozone and water is provided, comprising pumping a solution of ozonated water through a high cavitation rate homogenizing device, thereby causing formation of gas phase nanobubbles of ozone in the solution. The high cavitation rate homogenizing device may be a homogenizing mixer. In certain embodiments, the high cavitation rate homogenizing device is comprised of rotors and stators moving in close proximity relative to each other and separated by the solution of ozonated water. The relative motion of the rotors and stators may cause up to 500 million cavitation events per second in the solution of ozonated water, thereby causing the formation of gas phase nanobubbles of ozone.

The nanobubbles may be formed between 0.1 and 0.9 microns in diameter. In certain embodiments, the solution of ozone may include entrained microbubbles of ozone. In such circumstances, the high cavitation rate homogenizing device may cause cavitation of the microbubbles to form the nanobubbles. In certain embodiments, the method may further comprise causing hydraulic cavitation within the high cavitation rate homogenizing device, thereby causing enhanced formation of hydroxyl radicals in the solution.

Also according to the present disclosure, a computer-implemented method of treating waste water from a source is provided. The method comprises measuring the pH, oxidation-reduction potential, and total organic carbon of the waste water from the source, and communicating first measured values of pH, oxidation-reduction potential, and total organic carbon of the waste water to the computer; adding ozonated water at a first ozone concentration and at a first ozonated water flow rate into a volume of the waste water delivered from the source through a vessel; adding aqueous hydrogen peroxide solution at a first hydrogen peroxide concentration and a first hydrogen peroxide solution flow rate to the volume of the waste water; at least at one measurement location subsequent to the addition of ozonated water and aqueous hydrogen peroxide solution, measuring the pH, oxidation-reduction potential, and total organic carbon of the volume of the waste water and communicating second measured values of pH, oxidation-reduction potential, and total organic carbon to the computer; and executing an algorithm by the computer by which at least one of the first ozone concentration, first ozonated water flow rate, first hydrogen peroxide concentration, first hydrogen peroxide solution flow rate, and pH of a first portion of the volume of waste water discharged from the vessel is adjusted such that the oxidation-reduction potential of a second portion of the volume of waste water discharged from the vessel relative to the oxidation-reduction potential of the first portion of the volume of waste water discharged from the vessel is optimized.

The executing an algorithm by the computer may cause the total organic carbon of the second portion of the volume of waste water discharged from the vessel to be minimized. In certain embodiments, the method may further comprise recycling a third portion of the volume of waste water discharged from the vessel back into the vessel at a recycling flow rate. In such embodiments, the algorithm adjusts the recycling flow rate such that the oxidation-reduction potential of a second portion of the volume of waste water discharged from the vessel relative to the oxidation-reduction potential of the first portion of the volume of waste water discharged from the vessel is optimized.

In certain embodiments, the volume of the waste water delivered from the source flows through the vessel in plug flow. In certain embodiments, the ozonated water and the aqueous hydrogen peroxide solution are added to the volume of waste water simultaneously. In other embodiments, the aqueous hydrogen peroxide solution is added to the volume of waste water subsequent to adding the ozonated water to the volume of waste water. In certain embodiments, the pH of the first portion of the volume of waste water discharged from the vessel is adjusted to between 7.5 and 8.5.

BRIEF DESCRIPTION OF THE DRAWINGS

The present disclosure will be provided with reference to the following drawings, in which like numerals refer to like elements, and in which.

Figure 1A:
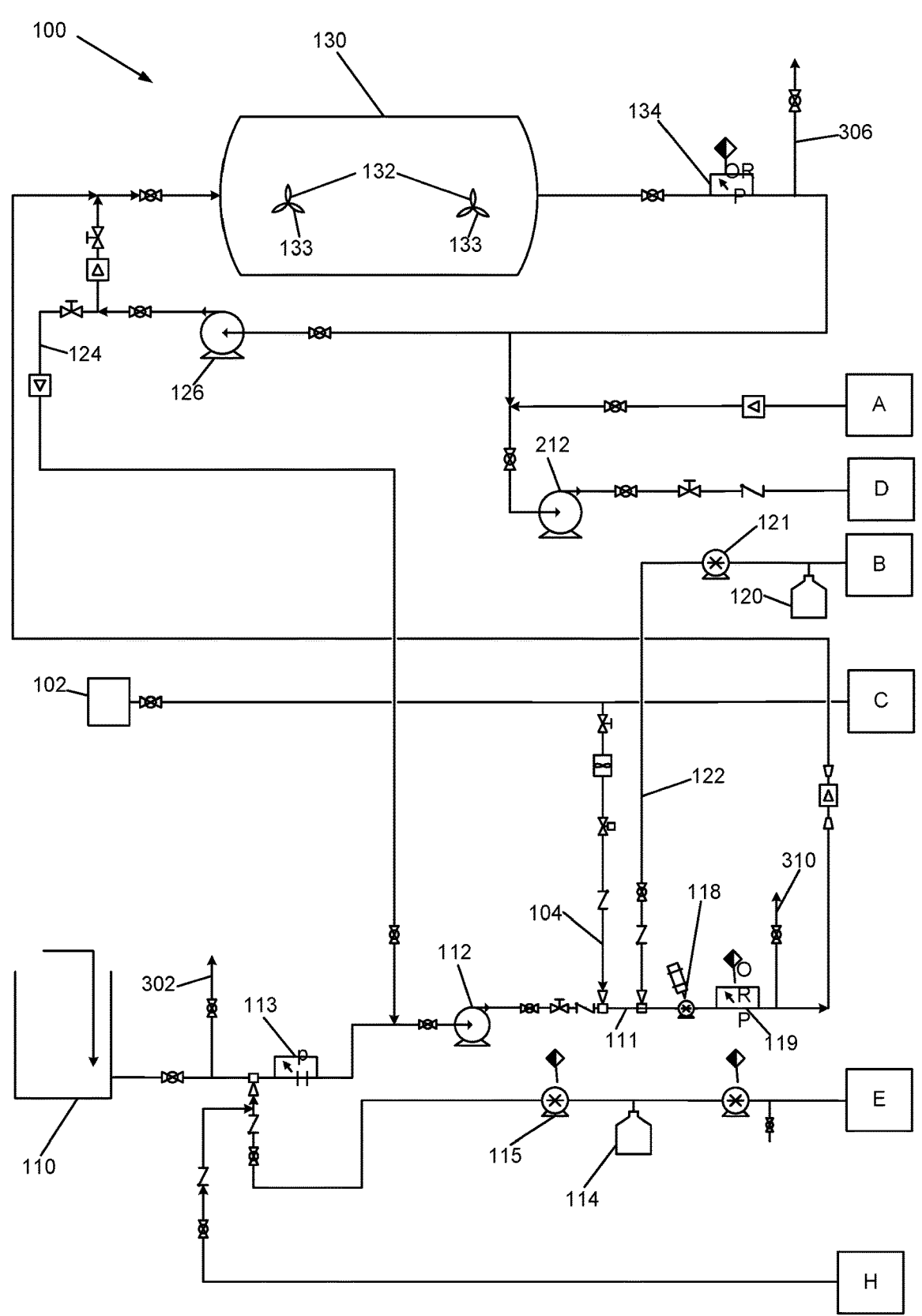
FIGS. 1A, 1B, and 1C in combination depict a schematic diagram of one embodiment of the Applicants' apparatus for the oxidative treatment of waste waters.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the claims.

BEST MODE FOR CARRYING OUT THE INVENTION

For a general understanding of the present invention, reference is made to the drawings. In the drawings, like reference numerals have been used throughout to designate identical elements.

Figure 1B:
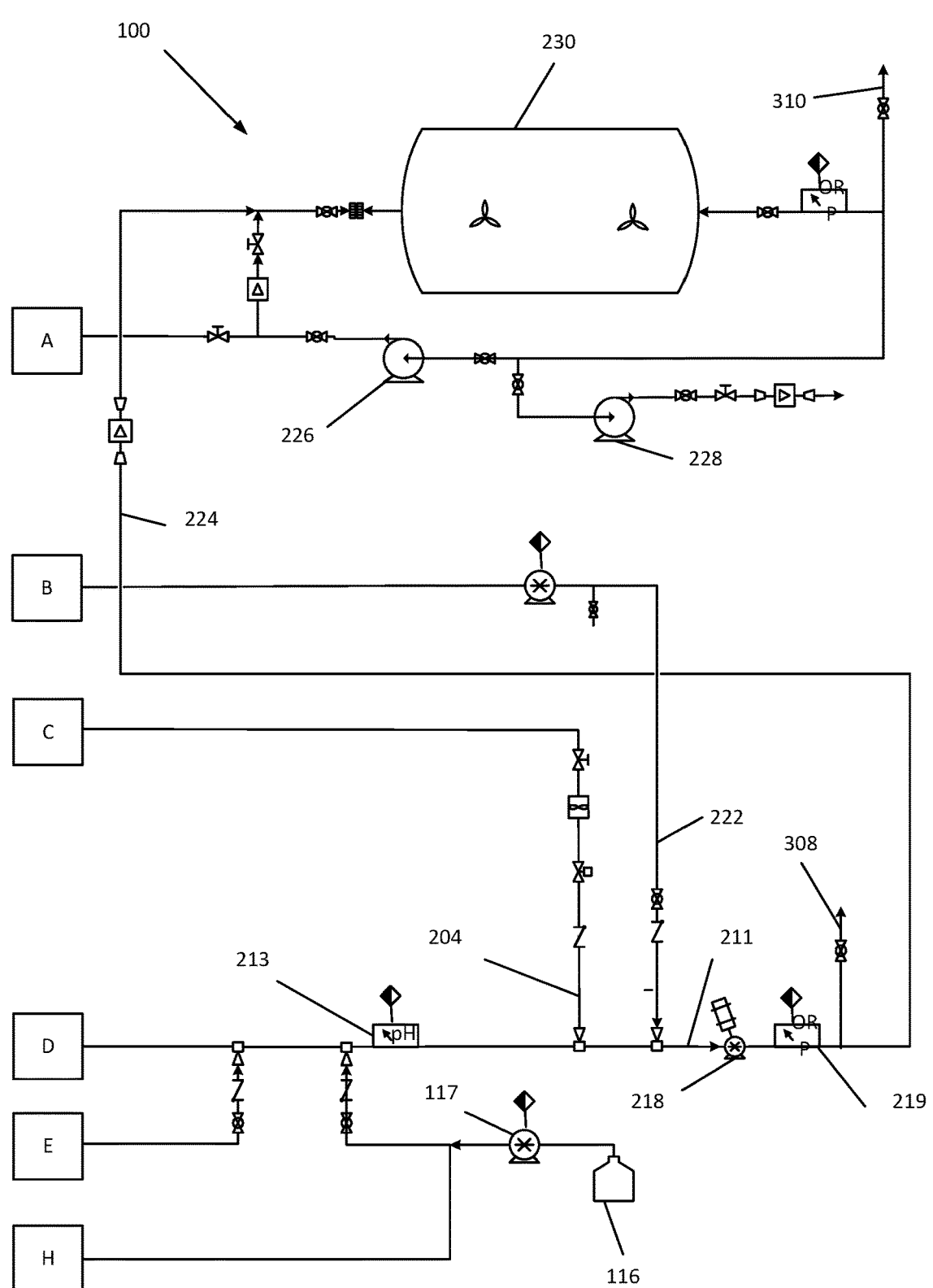
Figure 1C:
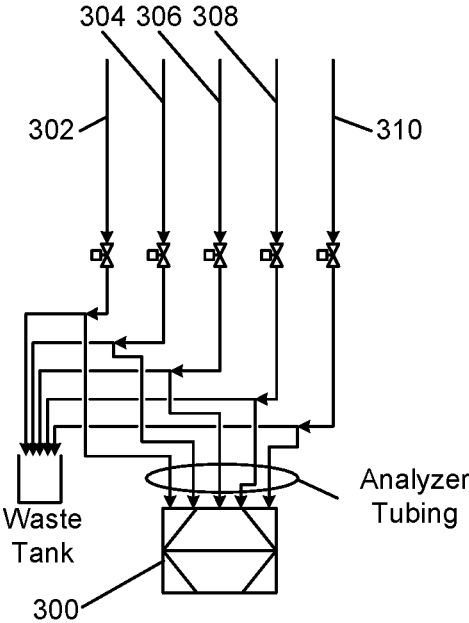
Figure 2:
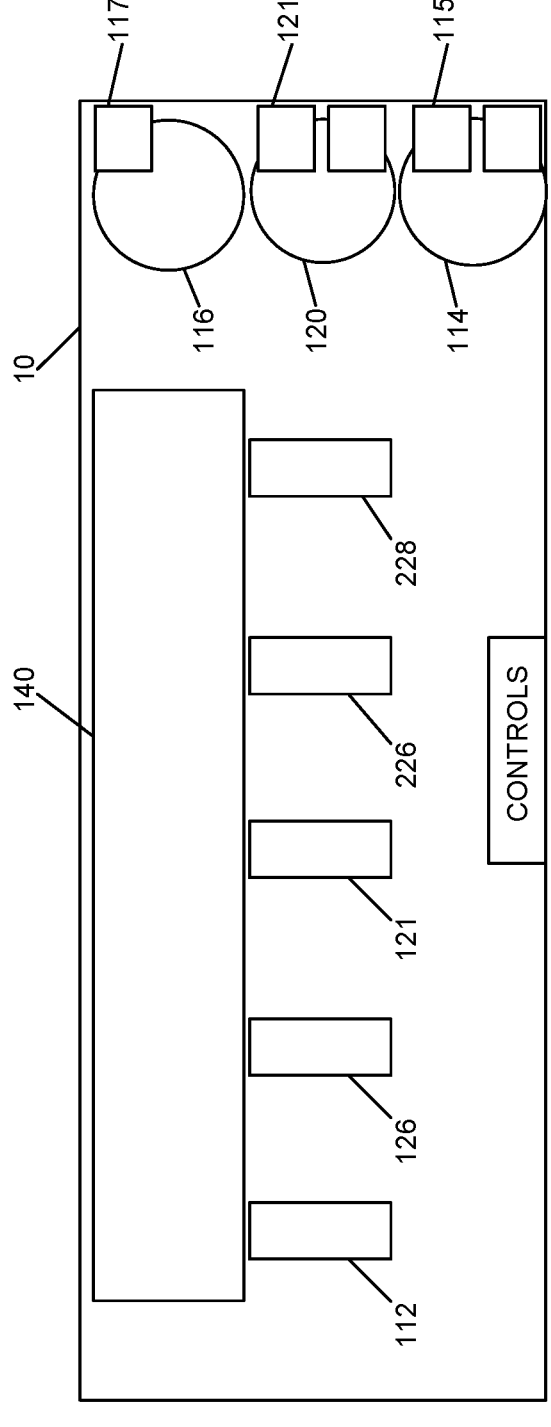
FIG. 2 is a schematic diagram of a portable oxidative treatment apparatus disposed on a trailer or other portable vehicle.

A prototype apparatus and method of the Applicants' oxidative treatment of waste water is shown schematically in FIGS. 1A-1C, and a further embodiment which is portable to a desired location is shown in the schematic diagram of FIG. 2. It is to be understood that in the following disclosure, the description of the Applicants' apparatus and method are to be considered exemplary, and that the specific equipment, scale, chemical reagents, proportions thereof, flow rates, mixing speeds, and other process parameters may vary from that described or shown in the drawings while still remaining functional and within the scope of the present invention.

The Applicants' oxidative treatment apparatus and method will now be described in detail with reference to apparatus 100 of FIGS. 1A-1C, and to apparatus 101 of FIG. 2. The exemplary apparatus 100 and 101 and related methods may be operable at a commercial scale, i.e. operable at a scale by a party engaged in commerce.

Referring to FIGS. 1A-1C, a source 102 of ozonated water is provided for the oxidative process. The source may be, e.g., a fresh water source, or recycled treated or partially treated water from a treatment process that occurs downstream of the instant process. In the case of oil and gas field application, the ozonated water may be provided by treatment of water via a conventional ozone process utilizing nano-bubble generation technology. In any event, this ozonated water is also referred to herein as "$O_3$ source water." The ozone concentration of this water is preferably at least 15 parts per million (ppm) of ozone. A lower concentration of ozone may be sufficient in certain applications in which the organic contamination in the treated water is lower; alternatively, the same level of ozone may be utilized and the flow rate increased through the system.

Waste water to be treated oxidatively is drawn in from a waste water source tank 110 with an influent pump 112. This pump 112 delivers the waste water into a first oxidative stage of the process comprising the addition of at least one oxidant to the waste water, followed by flow through a retention tank 130. The Total Organic Carbon (TOC) content of the incoming waste water may be measured by a Total Organic Carbon analyzer 300. The TOC analyzer may be provided with a sampling manifold that is connected to sampling conduits 302, 304, 306, 308, and 310 that are connected in turn to various conduit sampling locations in the apparatus 100. The incoming waste water is sampled via conduit 302.

The pH of the flowing waste water is monitored using pH meter 113, and adjusted to an optimum level by addition of base reagent such as sodium hydroxide from a vessel 114 or other source, or addition of an acid reagent such as hydrochloric acid from a vessel 116 or other source. The concentration of the sodium hydroxide and the hydrochloric acid will be adjusted according to the specific requirements of the waste water being treated. If the waste water is naturally buffered, strong acid and or sodium hydroxide may be used. If it is not naturally buffered, weaker concentrations may be required. The initial optimized pH is likely to be in the range of 7.5 to 8.5 for advanced oxidation applications.

Experimentation has shown that in a case of the use of advanced oxidation as described herein, when operating at a pH of greater than 8.5, the dissolved ozone may dissociate to oxygen, rendering it unavailable for oxidation of organic materials in the waste water. The pH adjustment system, which may include vessels 114 and 116, and pumps 115 and 117, is configured to accommodate lowering the pH as well as increasing it if necessary. Experimentation has demonstrated that in one embodiment of the instant method in which hydrogen peroxide may be the primary oxidative reactant, a pH no higher than 8.0 may be preferable. In addition, experimentation has also shown that some contaminants are oxidized effectively by ozone treatment alone at lower pH levels.

Apparatus 100 is further comprised of a hydrogen peroxide delivery system comprising vessel 120 for holding hydrogen peroxide solution, and a pump 121. Ozone and hydrogen peroxide are simultaneously added to the flowing waste water by delivering ozonated water and hydrogen peroxide solution into waste water conduit 111 via conduits 104 and 122, respectively. The oxidatively treated waste water then enters an inline mixer such as a static mixer 118 or a driven mixing pump or a high cavitation homogenizer or similar device. In one exemplary embodiment, a Series 328 static mixer manufactured by the Koflo Corporation of Cary, IL may be used. In another embodiment, a high cavitation homogenizer such as the "Cavitron" sold by Arde Barinco, Inc. of Carlstadt, NJ may be used. In this embodiment, the influent pressure from the pump 112 should be no less than one atmosphere to ensure the cavitation homogenizer is flooded and not under a vacuum.

At the outlet of the inline mixer 118, the oxidation-reduction potential (ORP) of the flowing waste water is measured with an inline sensor 119. The TOC of the flowing waste water may also be measured by the TOC analyzer 300 via sampling conduit 304.

The concentration of ozone and hydrogen peroxide in the waste water flowing in conduit 111 are each regulated in order to achieve an optimum ratio of each of the two reagents, which is described subsequently in this specification. The ozone concentration is regulated by regulating the flow of the $O_3$ source water, which is determined based upon the concentration of dissolved ozone in the source water. The hydrogen peroxide concentration may be regulated with a metering pump 121. The hydrogen peroxide reagent in vessel 120 may be provided at 50% concentration to minimize storage volumes.

The now ozonated/peroxidated waste water is metered and delivered to a retention tank 130 via conduit 124. In certain embodiments, the retention tank may be an elongated tank having an axis in the elongated direction that is horizontal. The elongated tank 130 may be cylindrical or rectangular. In one embodiment, the retention tank 130 may have a nominal capacity of 20,000 gallon. In certain embodiments, the inlet of the tank 130 and its shape are chosen to result in the waste water flowing through in a plug flow configuration from end to end of the tank 130.

In certain embodiments, the tank may be fitted with a very low speed, large blade diameter mixer 132 or mixers 132 having the impeller blades 133 thereof mounted proximate to the floor of the tank. In one exemplary embodiment, the mixer 132 may be comprised of an agitator blade having a diameter of between 6 and 8 feet, and operating at a rotational speed between one and five revolutions per minute. These mixers 132 are preferred because experimentation has demonstrated that the oxidative process using ozone and hydrogen peroxide process may in some circumstances produce a solid precipitate which should be kept in suspension in order to move the solid particulates through the remaining parts of the apparatus 100. In addition, the treated waste water may contain suspended material, which will similarly require agitation to maintain the solids in suspension as they pass through the retention tank 130. The speed must be regulated in order to just disrupt the sedimentation of the precipitated materials and maintain them in the flowing solution but not so much as to disturb the surface of the flowing fluid, thereby enabling the substantially plug flow regime through the tank described previously.

Upon exiting the retention tank 130, the waste water may be monitored again with an inline ORP (Oxidation Reduction Potential) sensor 134 and with the TOC analyzer 300 via sampling conduit 306 to determine the extent of oxidation of organic materials in the waste water that was achieved in the retention tank 130. Waste water may then be delivered to a second treatment stage. Alternatively or additionally, the waste water may be recirculated back to the inlet of the retention tank 130 in order to allow for additional retention time therein. Alternatively or additionally, the waste water may be delivered to the influent pump 112 for further oxidative processing with ozone and hydrogen peroxide and further mixing by pump or mixer 118. The apparatus 100 and associated method may be operated such that in exercising any of these options, a first portion of the waste water may be delivered to a first one of the two choices, and a second portion of the waste water may be delivered to the second of the two choices. In other words, at any branch point where the waste water may be delivered to two different destinations, the waste water flow may be split, with each destination receiving a portion.

These options provide additional treatment and retention time of the waste water. The balancing of the flows through the first treatment retention tank 130 may be an iterative process in order to achieve the desired level of oxidation of organic materials in the waste water. Initially the effective residence time within the tank 130 may be approximately 1 hour.

The second oxidative stage of the instant process proceeds in a similar manner to that of the first stage. The second oxidative stage is comprised of adding at least one oxidant to the waste water previously processed on the first oxidative stage, followed by flow through a second retention tank 230.

The pH of the flowing waste water is monitored using pH meter 213. A pH adjustment to a higher or lower pH as described previously using base and/or acid sources 114 and 116 may be performed.

Addition of the oxidants ozone and/or hydrogen peroxide to the second stage waste water flowing in conduit 211 is performed via conduits 204 and 222, respectively. Mixing of the oxidant reagents in conduit 211 is then performed by inline mixer or pump 218. At the outlet of the inline mixer 218, the oxidation reduction potential (ORP) of the flowing waste water is measured with an inline sensor 219. The TOC of the flowing waste water may also be measured by the TOC analyzer 300 via sampling conduit 308.

The oxidatively treated waste water is then metered into the second retention tank 230 via conduit 224. The pH adjustment for the second stage is designed to accommodate lowering the pH as well as increasing it if necessary. As was described for the first stage oxidative treatment, experimentation has demonstrated that in one embodiment of the instant method in which hydrogen peroxide may be the primary oxidative reactant, a pH no higher than 8.0 may be preferable. In addition, experimentation has also shown that some contaminants are oxidized effectively by ozone treatment alone at lower pH levels.

Upon exiting the retention tank 230, the waste water may be monitored again with an inline ORP sensor 234 and with the TOC analyzer 300 via sampling conduit 310 to determine the extent of oxidation of organic materials in the waste water that was achieved in the retention tank 230. Waste water may then be delivered to a third oxidative treatment stage (not shown). Alternatively or additionally, the waste water may be recirculated back to the inlet of the retention tank 230 in order to allow for additional retention time therein. Alternatively or additionally, the waste water may be delivered to the influent pump 212 for further oxidative processing with ozone and hydrogen peroxide and further mixing by pump or mixer 218. As described previously, at any branch point where the waste water may be delivered to two different destinations, the waste water flow may be split, with each destination receiving a portion. These options provide additional treatment and retention time of the waste water. The balancing of the flows through the second treatment retention tank 230 may be an iterative process in order to achieve the desired level of oxidation of organic materials in the waste water. Initially the effective residence time within the tank 230 may be approximately 1 hour.

As noted in the above descriptions of the first and second stage oxidative processes, the in-process waste water is tested with the inline Total Organic Carbon (TOC) analyzer 300. Samples of the waste water are taken on the influent waste water via sampling conduit 302, at the outlet of both inline mixers 118 and 218 following the injection of the O₃ source water and the hydrogen peroxide via respective sampling conduits 304 and 308, and at the outlet of each of the retention tanks 130 and 230 via respective sampling conduits 306 and 310. Field measurements of manually drawn samples for residual ozone may also be made at these points.

This TOC data is utilized to determine necessary adjustments to the settings of the pH, O₃ source water injection, the hydrogen peroxide injection and the recycle and retreatment flow rates to/from each of the retention tanks 130 and 230. The implementation of these adjustments may be an iterative process initially when treating a waste stream for the first or second time. The overall apparatus 100 and oxidative treatment process may be operated by a computer, which executes delivery of a waste specific ratio of each treatment chemical to control the process in an automated mode once the optimum conditions are determined. The ratio will correlate the pH, O₃ source water injection, the hydrogen peroxide injection and the recycle and retreatment flow rates surrounding each retention tank based upon data determined from initial treatment of similar wastes. Advantageously, by utilization of O₃ source water that is blended directly with the waste water in the instant process, the need for a gas diffusion device in contact with the waste water is eliminated, thereby eliminating the issue associated with fouling of the diffuser surface.

With regard to the generation of O₃ source water, in one embodiment, the O₃ source water may be produced through the use of commercially available nanobubble generators, which generate nanobubbles of ozone in the water, which then dissolve into the water liquid phase. As used herein, the term "nanobubbles" is meant to indicate a gas bubble having a diameter of between 0.1 and 0.9 microns in diameter. The utilization of nanobubbles to produce ozonated water for oxidative treatments of organic contaminant-containing waste water has demonstrated superior oxidation performance by virtue of improved dissolution of the ozone into the waste water when compared to larger bubbles historically utilized in ozone treatment systems such as micro bubbles.

In an alternative embodiment of the instant method and apparatus, nanobubbles of ozone are produced using a source other than a nanobubbles generator, thereby obviating the need to use a gas diffusion device in contact with the waste water. As noted previously, this eliminates the problem of fouling of the surface of a diffuser that produces the nanobubbles. In one alternative embodiment, the Applicants have discovered that the mixing pump 118 of the first oxidative stage and the mixing pump 218 of the second oxidative stage may be cavitation homogenizers or very high shear pumps that produce the nanobubbles of ozone.

Without willing to be bound to any particular theory, the Applicants believe that such homogenizers or pumps cause the formation of nanobubbles of ozone in the waste water. The Applicants further believe that the O₃ source water may be two phase flow that includes a liquid water phase, and ozone microbubbles of a diameter of approximately 1 to 100 microns in a gas phase and when such two phase flow contacts a cavitation homogenizer or shear pump immediately following the introduction of the O₃ source water, that nano bubbles of ozone of a diameter of 0.1 to 0.9 microns are produced. Such nanobubbles provide increased mass transfer of ozone into the liquid phase for subsequent oxidative reactions with organic contaminants in the waste water.

The Applicants believe that within a cavitation or homogenization device such as one of the CAVITRON continuous high cavitation rate homogenizer mixers manufactured by ARDE Barinco, Inc. of Carlstadt NJ, the multiple close clearance rotors and stators of the device pass each other, thereby producing as many as 500 million cavitation events per second. The microbubbles of ozone exposed to this level of cavitation at such a high frequency essentially explode and are reduced to nano bubbles. In certain embodiments, the addition of hydrogen peroxide oxidant described previously herein may be relocated downstream of the homogenizing cavitation device, in order to maximize the impact of the nanobubbles of ozone. Without wishing to be bound by any particular theory, the Applicants believe that it is preferable to form the nanobubbles from the cavitation of microbubbles before introduction of the hydrogen peroxide. The hydrogen peroxide in the presence of nanobubbles of ozone then causes rapid decomposition of the ozone to produce free radical oxygen atoms which in turn cause the advanced oxidation.

Recently, considerable research and development has been completed or is ongoing regarding the production of hydroxyl radicals during cavitation of an aqueous phase containing dissolved ozone. A significant portion of this research has been in the area of ultrasonic and optical cavitation, with a lesser amount of inquiry directed towards hydraulic cavitation. The Applicants believe that this lack of focus on hydraulic cavitation is primarily due to the lower typical energy available in hydraulic cavitation systems such as orifices and centrifugal pumps and the common assumption that in such systems there is a limited exposure of the fluids and bubbles to the cavitation instances as compared to ultrasonic cavitation. In summary, attempts to cause the formation of hydroxyl radicals by hydraulic cavitation have been less successful than by ultrasonic or optical cavitation.

The Applicants further believe that the resulting preponderance of cavitation events as referenced above results in significantly increased levels of hydroxyl radicals. The levels may approach that of ultrasonic cavitation, but at least far exceed that of conventional hydraulic cavitation. The Applicants believe that this enhances the action of the instant advanced oxidation process.

With regard to the correlation of the concentrations of ozone and hydrogen peroxide at the points of introduction into the waste water, the Applicants have determined by trials conducted on a commercial scale experimental apparatus that for a given waste stream there is an optimum treatment point which is determined by an asymptotic concentration of hydrogen peroxide when compared to the ORP reading at a given ozone concentration and pH. This correlation has been utilized to optimize retention time required to achieve a given treatment level.

For example, the applicants have found that in one instance at a pH of 8.5 and for a particular ozone flow rate into the waste water, the ORP reading will reach a constant level regardless of an increase in hydrogen peroxide concentration. This relationship results in a particular, measured level of reduction in dissolved organic matter within a specific time period.

The preceding methods for treating waste water may be computer implemented. In such embodiments, a computer-implemented method of treating waste water from a source comprises measuring the pH, oxidation-reduction potential, and total organic carbon of the waste water from the source, and communicating first measured values of pH, oxidation-reduction potential, and total organic carbon of the waste water to the computer. Ozonated water is added at a first ozone concentration and at a first ozonated water flow rate into a volume of the waste water delivered from the source through a vessel. Aqueous hydrogen peroxide solution is added at a first hydrogen peroxide concentration and a first hydrogen peroxide solution flow rate to the volume of the waste water. At least at one measurement location subsequent to the addition of ozonated water and aqueous hydrogen peroxide solution, the pH, oxidation-reduction potential, and total organic carbon of the volume of the waste water are measured and second measured values of pH, oxidation-reduction potential, and total organic carbon are communicated to the computer. The computer executes an algorithm by which at least one of the first ozone concentration, first ozonated water flow rate, first hydrogen peroxide concentration, first hydrogen peroxide solution flow rate, and pH of a first portion of the volume of waste water discharged from the vessel is adjusted such that the oxidation-reduction potential of a second portion of the volume of waste water discharged from the vessel relative to the oxidation-reduction potential of the first portion of the volume of waste water discharged from the vessel is optimized.

Example

The following example of operation of the Applicants apparatus and advanced oxidation waste water treatment method is to be considered exemplary and not limiting.

In an experimental trial, waste water was recovered from a hydraulically fractured oil or gas well. (This waste water is also known in the industry as "flowback water.") In the experimental trial, optimization of oxidation of the organic contaminants in the waste water was desired. The Applicants have found that not all of the organic matter can always be reduced, in which case separate chemical treatment is indicated. However the economically optimized level considered for this process is for treatment to the maximum level achievable with ozone and hydrogen peroxide alone within two to four hours of retention time. The process allows for longer treatment times if desired by the operator.

The following chemical relationships were discovered in performing the experimental trial:

When treating fracking flowback water with ozone alone (i.e. using only $O_3$ source water injection) at a dosage of 29 ppm, an ORP (Oxidation Reduction Potential) level in excess of 500 was achieved at pH of approximately 5. When hydrogen peroxide was added at a molar ratio of 7.3 of $H_2O_2$ to ozone (full dosage) at the pH of 5, essentially no effects caused by advanced oxidation were observed. Advanced oxidation is well documented in literature and has been described previously herein. It is the releasing of a highly reactive free radical (in this case, a hydroxyl radical, OH·) which will oxidize more organic matter and at a higher rate than ozone alone.

After increasing the pH of the same untreated waste water to 7.5, increasing the ozone dosage to 52 ppm, and not adding $H_2O_2$, the ORP decreased to 370+. Then adding hydrogen peroxide at the same 7.3 $H_2O_2$:ozone molar ratio as above, a decrease of ORP (indicating advanced oxidation) of 100 units was observed.

After increasing the pH to 8.5, using same ozone dosage of 52 ppm and no $H_2O_2$, the ORP level was slightly higher than that observed at a pH of 7.5. When adding hydrogen peroxide at a concentration of as little as 2.4 molar ratio of $H_2O_2$ to ozone, the largest advanced oxidation by of almost 200 units of ORP was observed.

After increasing the pH again to 8.8, and using the same 52 ppm ozone dosage and no $H_2O_2$, the ORP dropped to 172. When hydrogen peroxide was added at the 7.3 molar ratio of $H_2O_2$:ozone, no advanced oxidation was observed.

From their experimentation, the Applicants conclude the following: The efficacy of the oxidation using ozone alone, and ozone/$H_2O_2$ combined is very dependent on pH. On the particular waste water of this example, the best total oxidation was observed at a pH of between 7.5 and 8.5 with $H_2O_2$ added for advanced oxidation. With all $H_2O_2$ additions, advanced oxidation worked equally well at a high dosage (7.3 molar ratio), and down to a molar ratio of 2.4. The Applicants believe that excess $H_2O_2$ beyond the stoichiometrically required amount simply breaks down to water; and that at too high of a pH, both ozone and $H_2O_2$ decompose into water with little or no beneficial oxidation of organic contaminants occurring.

FIG. 2 is a schematic diagram of a portable oxidative treatment apparatus 101 that is disposed on a trailer 10 or other portable vehicle. The apparatus 101 may include acid vessel 116, acid pump 117, base vessel 114, base pump 115, hydrogen peroxide vessel 120, hydrogen peroxide pump 121, waste water influent pump 112, and first oxidative stage outlet/second oxidative stage supply pump 212 as described previously. The apparatus may be further comprised of first stage recirculation pump 126, second stage recirculation pump 226, second stage outlet pump 228, and a piping manifold assembly 140 for connection to retention tanks 130 and 230 (FIGS. 1A and 1B), and other process equipment and sensors.

It is, therefore, apparent that there has been provided, in accordance with the present invention, a method and apparatus for causing oxidative decomposition of organic contaminants in waste water. Having thus described the basic concept of the invention, it will be rather apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims.

We claim:

1. A method of making an oxidative treatment mixture in waste water, the method comprising:
   a) operating an ozone generating process to generate an ozone gas stream;
   b) producing ozonated water by generating microbubbles of ozone gas in water, the microbubbles comprising the ozone gas from the ozone gas stream;
   c) injecting the ozonated water into the waste water to produce oxidatively treated waste water; and
   d) causing division of the microbubbles of ozone gas in the oxidatively treated waste water into nanobubbles of ozone gas in the oxidatively treated waste water by pumping the oxidatively treated waste water through a high cavitation rate homogenizing device;
   e) adding hydrogen peroxide to the oxidatively treated waste water downstream of the high cavitation rate homogenizing device after causing division of the microbubbles of ozone gas in the oxidatively treated waste water into the nanobubbles.

2. The method of claim 1, wherein the high cavitation rate homogenizing device is a homogenizing mixer.

3. The method of claim 1, wherein the high cavitation rate homogenizing device is comprised of rotors and stators moving in close proximity relative to each other and separated by the oxidatively treated waste water, and wherein a relative motion between the rotors and stators cause hydraulic cavitation in the oxidatively treated waste water at the rotors and stators, thereby causing hydraulic cavitative division of the microbubbles of the gas in the oxidatively treated waste water into the nanobubbles of the gas in the oxidatively treated waste water.

4. The method of claim 1, wherein the nanobubbles of the gas in the oxidatively treated waste water are between 0.1 and 0.9 microns in diameter.

5. The method of claim 1, further comprising causing hydraulic cavitation within the high cavitation rate homogenizing device.

6. The method of claim 1, further comprising adjusting pH of the oxidatively treated waste water to between 7.5 and 8.5.

7. The method of claim 1, wherein a molar ratio of the hydrogen peroxide to ozone in the oxidatively treated waste water is between 2.4 and 7.3.

8. A method of making an oxidative treatment mixture in waste water, the method comprising:
   a) operating an ozone generating process to generate an ozone gas stream;
   b) producing ozonated water by generating microbubbles of ozone gas in water, the microbubbles comprising the ozone gas from the ozone gas stream;
   c) injecting the ozonated water into the waste water to produce oxidatively treated waste water;
   d) causing division of the microbubbles of ozone gas in the oxidatively treated waste water into nanobubbles of ozone gas in the oxidatively treated waste water by pumping the oxidatively treated waste water through a high cavitation rate homogenizing device;
   e) adding aqueous hydrogen peroxide to the oxidatively treated waste water downstream of the high cavitation rate homogenizing device after causing the division of the microbubbles of ozone gas in the oxidatively treated waste water into the nanobubbles; and
   f) adjusting pH of the oxidatively treated waste water to between 7.5 and 8.5.

9. The method of claim 8, wherein the nanobubbles of ozone gas in the oxidatively treated waste water are between 0.1 and 0.9 microns in diameter.

10. The method of claim 8, wherein a molar ratio of the aqueous hydrogen peroxide to ozone in the oxidatively treated waste water is between 2.4 and 7.3.

11. The method of claim 1, wherein the high cavitation rate homogenizing device is comprised of rotors and stators moving in close proximity relative to each other and separated by the oxidatively treated waste water, and wherein a relative motion of the rotors and stators cause up to 500 million cavitation events per second in the oxidatively treated waste water, thereby causing formation of gas phase nanobubbles of ozone.

* * * * *